(12) United States Patent
Shinohara

(10) Patent No.: US 6,751,574 B2
(45) Date of Patent: *Jun. 15, 2004

(54) SYSTEM FOR PREDICTING A DEMAND FOR REPAIR PARTS

(75) Inventor: Yukio Shinohara, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/201,572

(22) Filed: Jul. 24, 2002

(65) Prior Publication Data

US 2003/0014196 A1 Jan. 16, 2003

Related U.S. Application Data

(63) Continuation-in-part of application No. 10/050,954, filed on Jan. 22, 2002.

(30) Foreign Application Priority Data

Feb. 13, 2001 (JP) ........................................ 2001-035084

(51) Int. Cl.[7] ........................ G06F 101/14; G06F 15/00
(52) U.S. Cl. ..................................................... 702/179
(58) Field of Search ........................... 702/34, 35, 84, 702/33, 81, 179, 181; 705/1, 7, 10

(56) References Cited

U.S. PATENT DOCUMENTS 5,596,712 A * 1/1997 Tsuyama et al. ............ 714/726
6,226,597 B1 * 5/2001 Eastman et al. ............... 702/34
2002/0026395 A1 * 2/2002 Peterson ....................... 705/35
2002/0078403 A1 * 6/2002 Gullo et al. ................... 714/37

FOREIGN PATENT DOCUMENTS

| JP | 6-119370 | 4/1994 |
| JP | 7-065068 | 3/1995 |
| JP | 10-034122 | 2/1998 |
| JP | 2000-155700 | 6/2000 |

OTHER PUBLICATIONS

Raymond McLeod,Jr., Management Information Systems, 6th Edition, pp. 305 and 314.*

* cited by examiner

*Primary Examiner*—John Barlow
*Assistant Examiner*—Demetrius Pretlow

(57) ABSTRACT

A system for predicting a reliable demand for repair parts in which trouble rate in the future of the repair parts can be presumed accurately by a computer. The system has a database that collects various data, a summing up feature that extracts from the database troubles owing to durability deterioration from the causes of troubles to sum up the number of troubles owing to durability deterioration for each year elapsed, a calculating feature that calculates a trouble rate of the repair parts, a presuming feature that presumes a trouble rate of the repair parts after the guarantee period has elapsed, and a predicting feature that calculates market scale in the future of the repair parts from the presumed trouble rate of the repair parts after the guarantee period has elapsed.

2 Claims, 3 Drawing Sheets

| THE YEAR | TROUBLES OWING TO DURABILITY DETERIORATION | | | EXISTING CARS | | |
|---|---|---|---|---|---|---|
| | ~1y. | 1~2y. | 2~3y. | ~1y. | 1~2y. | 2~3y. |
| 1997 | 31 | - | - | 72,303 | - | - |
| 1998 | 33 | 41 | - | 74,615 | 71,667 | - |
| 1999 | 31 | 45 | 54 | 75,150 | 73,888 | 70,054 |
| 2000 | 30 | 43 | 53 | 74,218 | 74,401 | 72,796 |
| TOTAL | 125 | 129 | 107 | 296,286 | 219,956 | 142,850 |
| TROUBLE RATE(%) | 0.042 | 0.059 | 0.075 | | | |

Fig.2

| PART NUMBER | KIND OF CAR | TROUBLE OCCURRENCE DATE | DAYS ELAPSED | SYMPTOM | GUARANTEE PERIOD |
|---|---|---|---|---|---|
| 53601SF4 | B | 1997.02 | 1337 | BAD OPERATION(○) | 3y. |
| 53601SH3 | B | 1999.09 | 151 | BAD ADJUSTMENT(×) | 3y. |
| 53601SH3 | B | 1998.12 | 56 | BAD OPERATION(○) | 3y. |
| 53603SK2 | A | 1999.01 | 785 | BAD OPERATION(○) | 5y. |
| . | . | . | . | . | . |
| . | . | . | . | . | . |
| . | . | . | . | . | . |

Fig.3

| THE YEAR | TROUBLES OWING TO DURABILITY DETERIORATION | | | EXISTING CARS | | |
|---|---|---|---|---|---|---|
| | ~1y. | 1~2y. | 2~3y. | ~1y. | 1~2y. | 2~3y. |
| 1997 | 31 | - | - | 72,303 | - | - |
| 1998 | 33 | 41 | - | 74,615 | 71,667 | - |
| 1999 | 31 | 45 | 54 | 75,150 | 73,888 | 70,054 |
| 2000 | 30 | 43 | 53 | 74,218 | 74,401 | 72,796 |
| TOTAL | 125 | 129 | 107 | 296,286 | 219,956 | 142,850 |
| TROUBLE RATE(%) | 0.042 | 0.059 | 0.075 | | | |

SYSTEM FOR PREDICTING A DEMAND FOR REPAIR PARTS

CROSS REFERENCE

This is a CIP application of U.S. patent application Ser. No. 10/050,954 Jan. 22, 2002.

BACKGROUND OF THE INVENTION

1. Field of the Invention

The present invention relates to a system for predicting a demand for repair parts in future.

2. Description of the Related Art

With respect to a product, the number of existing products in future can be predicted roughly from statistics in the past, and a market scale in the future of repair parts of the product can be obtained roughly by multiplying the number of existing products by a presumed exchange rate of the repair parts. The exchange rate is that for repair and approximately equal to a trouble rate.

However, with respect to a functional part, the trouble rate thereof cannot be obtained theoretically. Therefore, the parts have been manufactured based on a prediction of market scale that was obtained by experiences or perceptions of experts.

Therefore, accuracy of the predicted trouble rate is very low and the degree of confidence of the predicted demand is poor, so that the number of the repair parts manufactured based on such prediction is not suited to actualities. As the result, stock of the repair parts becomes excessive or short.

The present invention has been made in view of the foregoing, and an object of the invention is to provide a system for predicting a demand for repair parts in which trouble rate in the future of the repair parts can be presumed accurately and a reliable demand prediction is possible.

SUMMARY OF THE INVENTION

In order to achieve the above object, the present invention provides a system for predicting for a demand of repair parts comprising: a database that collects data of number of troubles, causes of troubles and number of years that have elapsed with respect to a certain kind of repair parts on the basis of the repair parts exchanged owing to troubles within a guarantee period; summing up means that extracts from the database troubles owing to durability deterioration from the causes of troubles to sum up the number of troubles owing to durability deterioration for each year that has elapsed; yearly trouble rate calculating means that calculates a trouble rate of the repair parts for each year that has elapsed from the number of troubles summed up for each year that has elapsed and from the number of existing products for each year that has elapsed; trouble rate presuming means that presumes a trouble rate of the repair parts after the guarantee period has elapsed from the calculated trouble rate of the repair parts for each year that has elapsed; and market demand predicting means that calculates a market scale in future of the repair parts from the presumed trouble rate of the repair parts after the guarantee period has elapsed and from a presumed number of the existing products in future to predict a demand for the repair parts; wherein the summing up means, yearly trouble rate calculating means, trouble rate presuming means, and market demand predicting means constitutes a computer.

Since about 100% of the parts getting out of order within the guarantee period are exchanged free of charge, a substantially accurate trouble rate can be obtained based on data regarding the repair parts exchanged owing to troubles within the guarantee period.

Among causes of troubles, causes owing to initial quality poorness are those peculiar to an initial period and will not cause trouble after the guarantee period has elapsed. Therefore, if troubles owing to durability deterioration except for the initial quality poorness are extracted as basic data, an accurate trouble rate can be calculated.

If such an accurate trouble rate within the guarantee period is calculated for each year elapsed, a trouble rate after the guarantee period elapsed can be presumed accurately, and a market scale in the future of the repair parts can be calculated from the trouble rate and the presumed number of the products existing in the future to predict a demand for the repair parts accurately.

In the above-mentioned system for predicting a demand for repair parts, the trouble rate of the repair parts after the guarantee period has elapsed may be presumed by the trouble rate presuming means that makes a Weibull-analysis of the trouble rate of the repair parts for each year elapsed.

Since distribution of life times (trouble times) of articles goes roughly along the Weibull distribution, the trouble rate after the guarantee period has elapsed can be presumed accurately by making the Weibull-analysis of the trouble rate of the repair parts for each year elapsed.

BRIEF DESCRIPTION OF THE DRAWINGS

FIG. 2 shows a table showing an example of data of troubles within the guarantee period with respect to automobile repair parts according to the embodiment of the present invention;

FIG. 3 is a table showing troubles of the repair parts for each year elapsed within the guarantee period.

DESCRIPTION OF THE PREFERRED EMBODIMENT

Hereafter, an embodiment of the present invention will be described with reference to FIGS. 1 to 4. The disclosed system for predicting a demand for repair parts in future is used to predict a demand for automobile repair parts.

Figure 1:
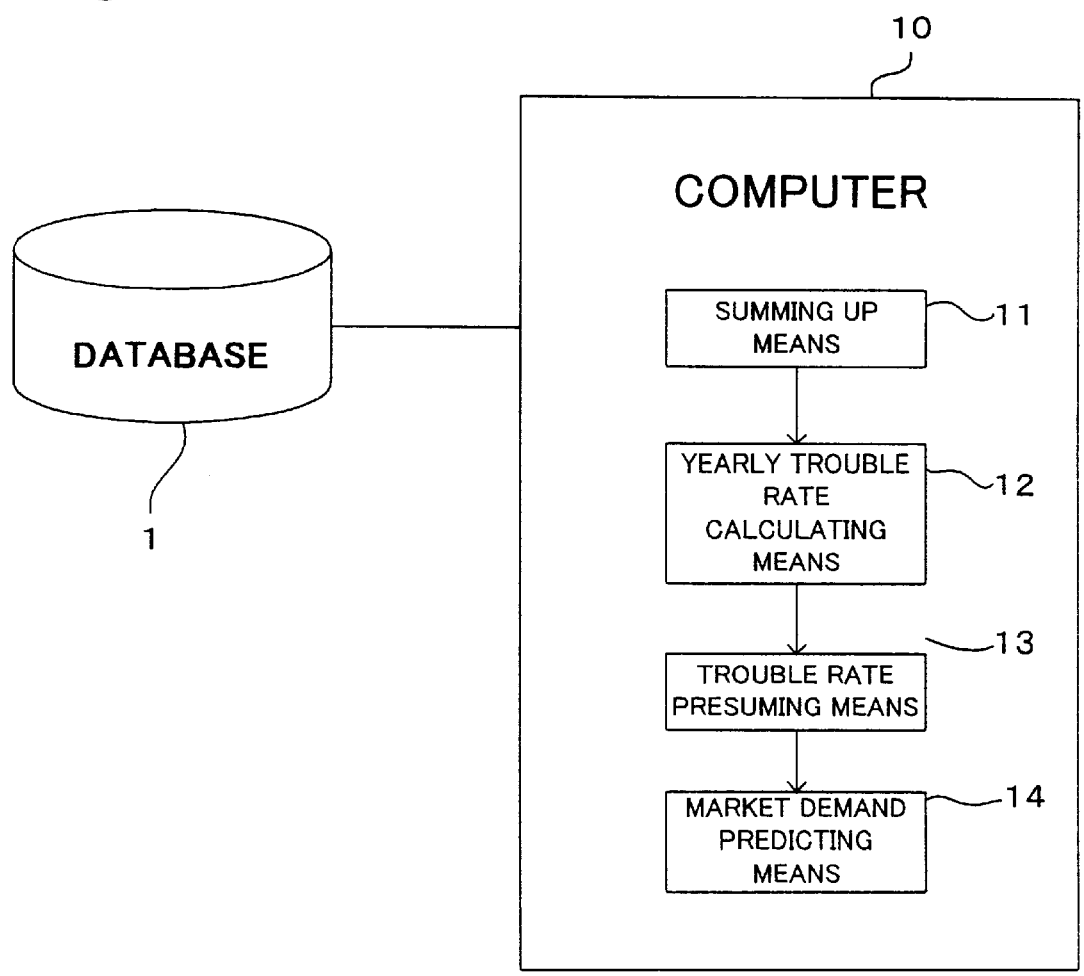
FIG. 1 is a block diagram showing a system for predicting a demand for repair parts, such as automobile repair parts, in future, according to an embodiment of the present invention.

As shown in FIG. 1, the system is a computer system using a computer 10 that predicts a demand for repair parts on the basis of data from a database 1. The computer 10 has a summing up means 11, yearly trouble rate calculating means 12, trouble rate presuming means 13 and market demand predicting means 14.

First, data of troubles within the guarantee period with respect to the repair parts are collected in the data base 1.

As shown in FIG. 2, data such as part number, kind of car, trouble occurrence date, days that have elapsed till trouble occurred, symptoms and guarantee period are collected for each kind of repair parts having got into a trouble.

With respect to the symptoms, if cause of the trouble is durability deterioration, a distinction mark "o" is attached, and if cause of trouble is initial quality poorness, a distinction mark "x" is attached.

The summing up means 11 of the computer 10 extracts necessary data from the database 1 and makes calculation to sum up the number of troubles of the repair parts in each year owing to durability deterioration (the distinction mark is "o". The number of troubles is listed for each year from the first year of the guarantee period.

FIG. 3 shows an example of a list obtained with regard to a certain kind of repair parts. The guarantee period of the repair parts is 3 years and the cause of trouble is durability deterioration. The list of FIG. 2 also shows the number of existing motorcars using the repair parts for each year.

The number of troubles and the number of existing motorcars for each year that has elapsed are shown with respect to each year, and a total of the troubles and a total of the existing motorcars for each year that has elapsed are shown.

The yearly trouble rate calculating means 12 calculates a trouble rate (%) obtained by dividing the total troubles by the total existing motorcars for each year that has elapsed. The trouble rate is also shown in the list of FIG. 3.

Figure 4:
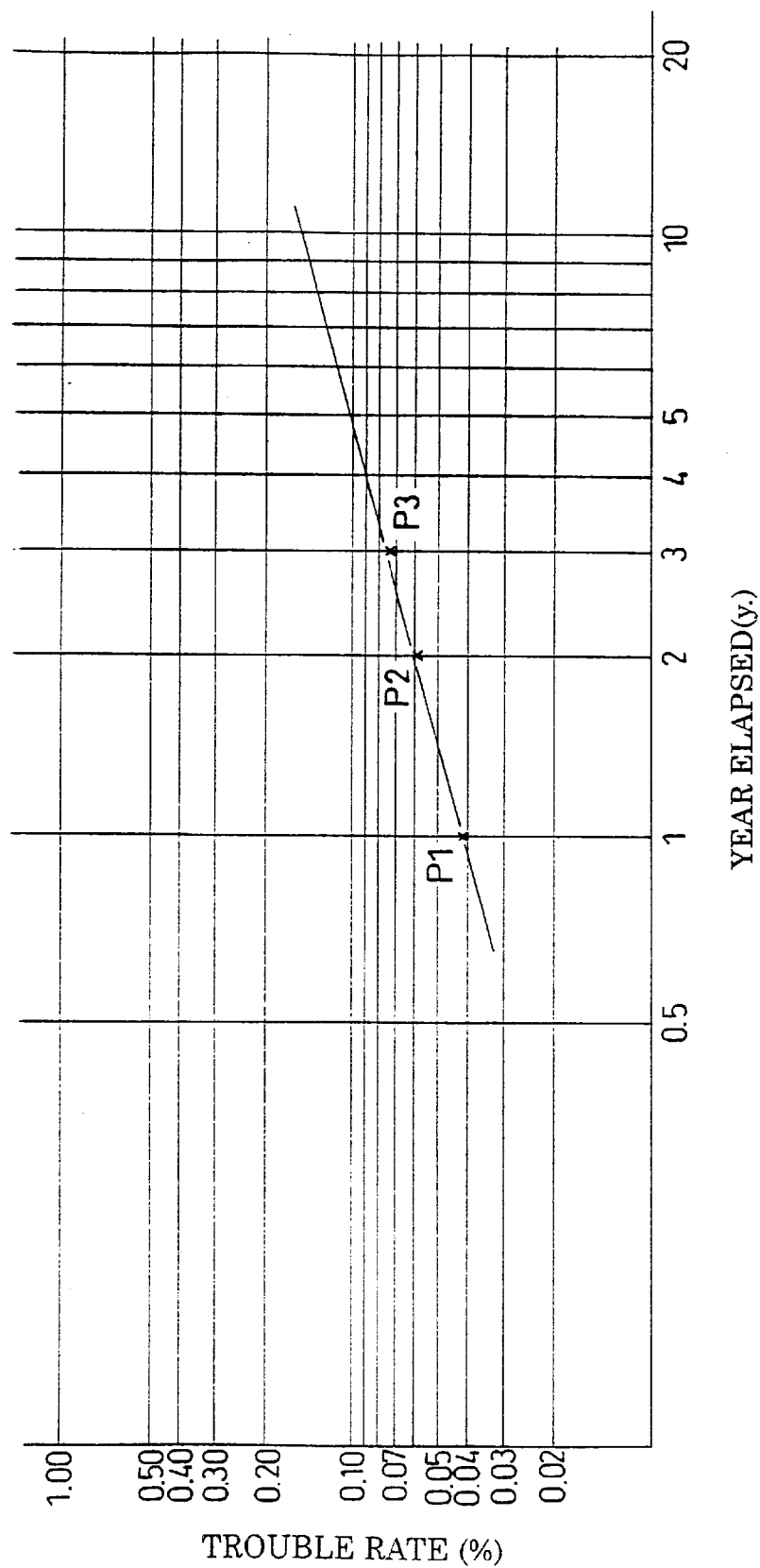
FIG. 4 shows a Weibull probability sheet on which the trouble rates for each year elapsed of FIG. 3 are plotted to describe a recurrence linear line.

Next, the trouble rate presuming means 13 makes a Weibull probability analysis of the trouble rate in each year that has elapsed. That is, such trouble rates for each year elapsed are plotted on a Weibull probability sheet as shown in FIG. 4.

The abscissa (logarithmic scale) of the sheet indicates year elapsed and the ordinate (logarithmic scale) of the sheet indicates trouble rate (%).

The plot P1 shows that the trouble rate at a time when one year elapsed is 0.042%, the plot P2 shows that the trouble rate at a time when two years elapsed is 0.059%, and the plot P3 shows that the trouble rate at a time when three years elapsed is 0.075%.

A recurrence linear line L of the three points (P1, P2, P3) is calculated and described on the Weibull probability sheet as shown in FIG. 3. If the recurrence linear line L is extended beyond the guarantee period, the trouble rate in the future of the repair parts can be presumed.

This presumed trouble rate can be regarded as a presumed parts exchange rate. The market demand predicting means 14 predicts future market demand or scale of the repair parts, which can be obtained substantially exactly by multiplying a presumed number of existing motorcars in the future by the presumed parts exchange rate.

In FIG. 4, for example, the trouble rate of the repair parts at a time when five years have elapsed can be presumed to be about 0.105%. If the presumed number of existing cars of the corresponding year is 71,000, demand of the repair parts at the year can be predicted to be 75 (71,000×0.00105).

Since about 100% of the parts getting out of order within the guarantee period are exchanged free of charge, the trouble rate in the future introduced based on the trouble rate within the guarantee period as mentioned above is substantially exact and reliable.

Since only troubles owing to durability deterioration are extracted as basic data excluding troubles owing to initial quality poorness not influencing future demand, factors to reduce accuracy of trouble rate in the future are eliminated, and a trouble rate of high accuracy can be presumed.

Since distribution of life times (trouble times) of articles goes roughly along the Weibull distribution, the trouble rate after the guarantee period has elapsed can be presumed accurately by making a Weibull-analysis of the trouble rates of the repair parts for each year elapsed.

In the above-mentioned embodiment, demand for repair parts of motorcars is predicted. But the present invention can be applied to repair parts of any product other than the motorcars, if the existing number of the products can be grasped, and a roughly exact demand can be predicted.

What is claimed is:

1. A system for predicting for a demand for repair parts comprising:

a database that collects data of number of troubles, causes of troubles and number of years that have elapsed with respect to a certain kind of repair parts on the basis of said repair parts exchanged owing to troubles within a guarantee period;

summing up means that extracts from said database troubles owing to durability deterioration from said causes of troubles to sum up the number of troubles owing to durability deterioration for each year that has elapsed;

yearly trouble rate calculating means that calculates a trouble rate of said repair parts for each year that has elapsed from said number of troubles summed up for each year that has elapsed and from the number of existing products for each year that has elapsed;

trouble rate presuming means that presumes a trouble rate of said repair parts after said guarantee period has elapsed from said calculated trouble rate of said repair parts for each year that has elapsed; and market demand predicting means that calculates a market scale in future of said repair parts from said presumed trouble rate of said repair parts after said guarantee period has elapsed and from a presumed number of said existing products in future to predict a demand for said repair parts;

said summing up means, yearly trouble rate calculating means, trouble rate presuming means, and market demand predicting means constituting a computer.

2. The system for predicting a demand for repair parts as claimed in claim 1, wherein said trouble rate presuming means operates to presume said trouble rate of said repair parts after said guarantee period has elapsed, by making a Weibull-analysis of said trouble rate of said repair parts for each year elapsed.

* * * * *